(12) United States Patent
Chen (10) Patent No.: US 11,740,701 B2
(45) Date of Patent: Aug. 29, 2023

(54) HAPTICS STRUCTURE AND METHOD FOR FABRICATING THE SAME, TOUCH DISPLAY PANEL AND TOUCH DISPLAY DEVICE

(71) Applicant: BOE Technology Group Co., Ltd., Beijing (CN)

(72) Inventor: Yuju Chen, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 17/486,686

(22) Filed: Sep. 27, 2021

(65) Prior Publication Data

US 2022/0129074 A1  Apr. 28, 2022

(30) Foreign Application Priority Data

Oct. 23, 2020  (CN) .......................... 202011145301.5

(51) Int. Cl.
*G06F 3/0488* (2022.01)
*G06F 3/01* (2006.01)
*G06F 3/041* (2006.01)

(52) U.S. Cl.
CPC .............. *G06F 3/016* (2013.01); *G06F 3/041* (2013.01); *G06F 2203/04103* (2013.01)

(58) Field of Classification Search
None
See application file for complete search history.

(56) References Cited

U.S. PATENT DOCUMENTS

| 2013/0234988 A1* | 9/2013 | Ando | G06F 3/0488 |
| | | | 345/174 |
| 2018/0074694 A1* | 3/2018 | Lehmann | G06F 3/0447 |

\* cited by examiner

*Primary Examiner* — Carl Adams
(74) *Attorney, Agent, or Firm* — IPRO, PLLC (57) ABSTRACT

This application provides a haptics structure and a method for fabricating the same, a touch display panel and a touch display device. The haptics structure includes: a base substrate; a platelike deformer on the base substrate; and a strain gauge structure. The deformer includes a first transparent electrode, a second transparent electrode and an electrostrictive material layer between the first transparent electrode and the second transparent electrode, and the electrostrictive material layer is deformed when a voltage is applied between the first transparent electrode and the second transparent electrode. The strain gauge structure is located on a side of the deformer away from the base substrate, and is configured to measure a deformation amount of the deformer.

19 Claims, 3 Drawing Sheets

HAPTICS STRUCTURE AND METHOD FOR FABRICATING THE SAME, TOUCH DISPLAY PANEL AND TOUCH DISPLAY DEVICE

CROSS-REFERENCE TO RELATED APPLICATIONS

This application claims a priority to Chinese Patent Application No. 202011145301.5 filed in China on Oct. 23, 2020, which is incorporated herein by reference in its entirety.

TECHNICAL FIELD

The present disclosure relates to the field of display technologies, in particular to a haptics structure and a method for fabricating the same, a touch display panel and a touch display device.

BACKGROUND

Haptics is the focus of today's scientific and technological development, and its concept is to make a device terminal interact with a human body based on tactile sense. Haptics can be divided into two categories, one is vibration feedback technique, which generates touch feedback after touch control; the other is surface tactile rendering technique, which can form the simulation of tactile impression on a surface of a screen, so that the object characteristics can be perceived by a bare finger touching the screen, and efficient and natural interaction is realized in the multimedia terminal, which has great research value, and thus has been widely concerned by researchers in the industry.

A surface tactile rendering apparatus is classified into a vibration type, a pressure type, a diaphragm type, an electrostatic force type, and an electrical stimulation type. The formation of tactile sense can be divided into two categories: vibration sense and roughness (tactile impression). The vibration sense is mainly from the interaction between a positive force and the apparatus, so that skin receptors feel the action of the positive force; and the roughness is from the interaction between the skin (for example, the fingertip skin) and the surface of the apparatus, resulting in different friction due to different surface structures.

SUMMARY

In a first aspect, embodiments of the present disclosure provide a haptics structure, which includes: a base substrate; a platelike deformer on the base substrate, where the deformer includes a first transparent electrode, a second transparent electrode and an electrostrictive material layer between the first transparent electrode and the second transparent electrode, where the electrostrictive material layer is deformed when a voltage is applied between the first transparent electrode and the second transparent electrode; and a strain gauge structure located on a side of the deformer away from the base substrate, configured to measure a deformation amount of the deformer.

In some embodiments, the electrostrictive material layer includes a piezoelectric ceramic.

In some embodiments, a thickness of the electrostrictive material layer is between 2 um and 20 um, where endpoint values are inclusive.

In some embodiments, the base substrate and the deformer are bonded together through a polydimethylsiloxane (PDMS) film; and/or the strain gauge structure and the deformer are bonded together through a PDMS film.

In some embodiments, the haptics structure further includes a protective film located on a side of the strain gauge structure away from the base substrate.

In some embodiments, each of the first transparent electrode and the second transparent electrode has a thickness ranging from 40 nm to 300 nm, and the PDMS film has a thickness ranging from 2 um to 4 um.

In some embodiments, the haptics structure further includes: a controller, where the controller is configured to: send a voltage control signal to the deformer based on a touch operation on the haptics structure, where a voltage magnitude of the voltage control signal has a preset corresponding relation with a touch pressure of the touch operation.

In some embodiments, the controller is configured to: receive the deformation amount of the deformer that is under an action of the voltage control signal and is measured by the strain gauge structure; determine whether the deformation amount satisfies a requirement of the touch operation; and adjust the voltage control signal, and send the adjusted voltage control signal to the deformer, when the deformation amount does not satisfy the requirement of the touch operation.

In some embodiments, one of the first transparent electrode and the second transparent electrode is grounded, and the other of the first transparent electrode and the second transparent electrode is inputted with the voltage control signal sent by the controller; the voltage control signal is an alternating current voltage signal, and the controller is configured to set a frequency and an amplitude of the alternating current voltage signal based on the touch pressure of the touch operation.

In a second aspect, embodiments of the present disclosure also provide a touch display panel including the haptics structure described above. The touch display panel further includes a touch screen and a display panel, the touch screen is arranged on a display side of the display panel, and the haptics structure is arranged on a side of the touch screen away from the display panel.

In some embodiments, the touch display panel includes a display area and a bezel area, where the haptics structure is located in the display area of the display panel.

In a third aspect, embodiments of the present disclosure also provide a touch display device including the touch display panel described above.

In some embodiments, the touch display device includes: a touch detection circuit and a controller. The touch detection circuit is configured to: detect a touch operation on the touch screen, and send a touch pressure and a touch position of the touch operation to the controller. The controller is configured to: send a voltage control signal to the deformer of the haptics structure based on the touch pressure and the touch position of the touch operation, where a voltage magnitude of the voltage control signal has a preset corresponding relation with the touch pressure of the touch operation.

In some embodiments, the controller is configured to: receive the deformation amount of the deformer that is under an action of the voltage control signal and is measured by the strain gauge structure; determine whether the deformation amount satisfies a requirement of the touch pressure of the touch operation; and adjust the voltage control signal and send the adjusted voltage control signal to the deformer, when the deformation amount does not satisfy the requirement of the touch pressure of the touch operation.

In a fourth aspect, embodiments of the present disclosure also provide a method for fabricating the above haptics structure, which includes:

providing the base substrate;

fabricating the platelike deformer on the base substrate, where the fabricating the platelike deformer on the base substrate includes: fabricating the first transparent electrode, the electrostrictive material layer and the second transparent electrode sequentially on the base substrate; and forming the strain gauge structure on the side of the deformer away from the base substrate.

In some embodiments, the fabricating the platelike deformer on the base substrate includes:

providing a sapphire substrate;

growing the electrostrictive material layer on the sapphire substrate;

forming the first transparent electrode on a side of the electrostrictive material layer away from the sapphire substrate;

bonding a surface of the first transparent electrode away from the sapphire substrate onto the base substrate;

peeling the sapphire substrate from the electrostrictive material layer; and forming the second transparent electrode on a side of the electrostrictive material layer away from the first transparent electrode, where the forming the strain gauge structure on the side of the deformer away from the base substrate includes: forming the strain gauge structure on a side of the second transparent electrode away from the electrostrictive material layer.

In some embodiments, the electrostrictive material layer includes a piezoelectric ceramic film, and after growing the electrostrictive material layer on the sapphire substrate, the method further includes: performing air annealing on the piezoelectric ceramic film at a temperature greater than 650° C. for not less than one hour.

In some embodiments, the bonding a surface of the first transparent electrode away from the sapphire substrate onto the base substrate includes: bonding the first transparent electrode and the base substrate by using a polydimethylsiloxane (PDMS) film through thermally pressing.

In some embodiments, the forming the strain gauge structure on the side of the second transparent electrode away from the electrostrictive material layer includes: bonding the second transparent electrode and the strain gauge structure by using a polydimethylsiloxane (PDMS) film through thermally pressing.

In some embodiments, the peeling the sapphire substrate from the electrostrictive material layer includes: peeling the sapphire substrate from the electrostrictive material layer by using a laser with a first wavelength ranging from 230 nm to 260 nm.

REFERENCE SIGNS

1: Bezel;
2: Display screen;
11: Groove;
12: Piezoelectric vibrator;
3: Display panel;
4: Joint adhesive;
5: Haptics structure;
51: Base substrate;
52, 56: PDMS film layer;
53: First transparent electrode;
54: Piezoelectric ceramic film;
55: Second transparent electrode;
57: Strain gauge structure;
58: Protective film;
59: Sapphire substrate;
571: First trace;
572: Second trace.

DETAILED DESCRIPTION

In order to make the technical problems to be solved, technical solutions and advantages of the present disclosure clearer, a detailed description will be given below with reference to the accompanying drawings and specific embodiments.

Figure 1:
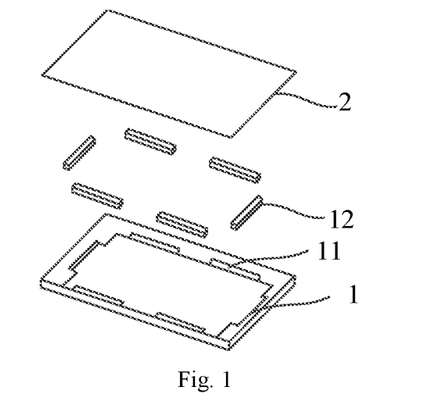
FIG. 1 is a schematic view of a display combined with tactile rendering structure in the related art.

A device of combining a display technique with a tactile rendering technique in the related art is shown in FIG. 1. A bezel 1 of a display screen 2 is provided with grooves 11, piezoelectric vibrators 12 are placed in the grooves 11, and the piezoelectric vibrators 12 are located in the periphery of the display screen 2. When tactile rendering is performed, the display screen 2 is driven to vibrate by the vibration of the piezoelectric vibrator 12, and a contact area between the piezoelectric vibrator 12 and the display screen 2 is limited, which cannot effectively drive the display screen 2 to vibrate, resulting in a poor touch interaction experience. In addition, limited to the size of the bezel provided with the piezoelectric vibrators, it is difficult for a display device to realize a narrow bezel.

Embodiments of the present disclosure provide a haptics structure and a fabrication method thereof, a touch display panel and a touch display device, so as to improve the touch interaction experience and facilitate the realization of a display device with a narrow bezel.

Embodiments of the present disclosure provide a haptics structure, which includes: a base substrate; a platelike deformer on the base substrate, where the deformer includes a first transparent electrode, a second transparent electrode and an electrostrictive material layer between the first transparent electrode and the second transparent electrode, where the electrostrictive material layer is deformed when a voltage is applied between the first transparent electrode and the second transparent electrode; and a strain gauge structure located on a side of the deformer away from the base substrate, configured to measure a deformation amount of the deformer.

In this embodiment, a platelike deformer is provided on the base substrate; when a voltage is applied between the first transparent electrode and the second transparent electrode, the electrostrictive material layer located between the first transparent electrode and the second transparent electrode is deformed, and then the whole platelike deformer is deformed. In this manner, when the haptics structure is applied to a touch display device, the deformer can cover part of a display area of the display panel, or even the whole display area, such that when haptics is performed, the deformer can effectively drive various regions of the display panel to vibrate, thereby improving the touch interaction experience and increasing the perceived effect of surface haptics. Furthermore, when the haptics structure provided by the embodiments of the present disclosure is applied to the touch display device, the haptics structure may be provided in a display area of a display panel, and as compared to a display device with a piezoelectric vibrator provided on a bezel in the related art, such a display panel is advantageous in realizing a narrow bezel. Each of the film layers of the haptics structure is made of a light-transmitting material so that when the haptics structure is provided in the display area of the display panel, the light transmittance of the display panel will not be greatly affected.

In some embodiments, the haptics structure further includes: a controller, where the controller is configured to: send a voltage control signal to the deformer based on a touch operation from a user on the haptics structure, where a voltage magnitude of the voltage control signal has a preset corresponding relation with a touch pressure of the touch operation.

In some embodiments, the controller is configured to: receive the deformation amount of the deformer under an action of the voltage control signal that is measured by the strain gauge structure; determine whether the deformation amount satisfies a requirement of the touch operation; and adjust the voltage control signal, and send the adjusted voltage control signal to the deformer, when the deformation amount does not satisfy the requirement of the touch operation.

In an embodiment, the haptics structure may include one deformer or a plurality of deformers that are independent from each other. In a case that the haptics structure includes one deformer, and the haptics structure is applied to a touch display device, the size of the deformer may be equal to or substantially equal to the size of a display area of a display panel. When a user touches a touch screen of the display panel, the controller of the touch display device sends a control signal to the deformer, and the deformer is deformed to drive the whole display panel to vibrate, thereby generating a corresponding feedback for the user's touch operation and effectively improving the touch interaction experience. In a case that the haptics structure includes a plurality of deformers independent from each other, and the haptics structure is applied to a touch display device, the deformers may be arranged in an array in a display area of a display panel, and a controller of the touch display device is connected to the plurality of deformers. When a user touches the touch screen, the controller sends a control signal to a deformer located at a touch position according to a position touched by the user, and controls the deformer at the touch position to deform, so as to generate a corresponding feedback for the touch operation of the user, thereby effectively improving the touch interaction experience. The deformer may include an electrostrictive material layer. The electrostrictive material layer is a material having an electromechanical coupling effect, and is deformed to some extent under the induction of an external electric field, and the deformation extent is proportional to the square of the magnitude of the electric field intensity.

It may be appreciated that when the haptics structure is applied to a touch display device, the controller of the touch display device may be shared with the controller of the haptics structure. For example, the controller of the haptics structure is omitted, and functions of the controller of the haptics structure are implemented by the controller of the touch display device, e.g. by a flexible printed circuit (FPC) or a chip of the touch display device.

It may be appreciated that the controller may be implemented in the form of a circuit, a micro control unit (MCU), a chip, or a processor.

In some optional embodiments, the base substrate is a flexible base substrate. For example, the base substrate is made of a PET (polyethylene terephthalate) film. In some optional embodiments, the first transparent electrode and the second transparent electrode is made of a transparent conductive material such as Indium Tin Oxide (ITO) or Indium Zinc Oxide (IZO). Since the first transparent electrode and the second transparent electrode are light-transmitting, when the deformer is provided in the display area of the display panel, the display effect of the display panel will not be affected. In some optional embodiments, the electrostrictive material layer may be a piezoelectric ceramic, or may be made of other materials, which is not limited thereto. In some embodiments, a thickness of the electrostrictive material layer is between 2 um and 20 um, where endpoint values are inclusive. When the thickness of the electrostrictive material layer is in the above-mentioned range, it is ensured that effective deformation of the electrostrictive material layer is driven by an electric signal.

Since the adhesion between the first transparent electrode and the base substrate is not strong, in some embodiments, the base substrate and the deformer may be bonded together via a PDMS (polydimethylsiloxane) film, which may improve the adhesion performance between the first transparent electrode and the base substrate. Similarly, the adhesion between the second transparent electrode and the strain gauge structure is not strong, and in some embodiments, the strain gauge structure and the deformer may be bonded together via a PDMS film, which may improve the adhesion performance between the second transparent electrode and the strain gauge structure.

Figure 2:
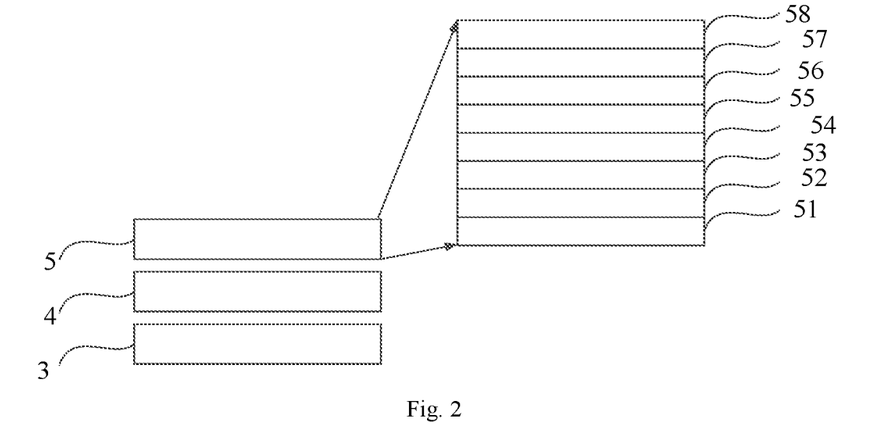
FIG. 2 is a schematic view of a haptics structure according to an embodiment of the present disclosure.

FIG. 2 is a schematic view of a haptics structure according to an embodiment of the present disclosure. As shown in FIG. 2, when the haptics structure 5 is applied to a touch display device, the haptics structure 5 may be bonded to the display panel 3 via a bonding adhesive 4, and the haptics structure 5 includes: a base substrate 51, a PDMS film layer 52, a first transparent electrode 53, a piezoelectric ceramic film 54, a second transparent electrode 55, a PDMS film layer 56 and a strain gauge structure 57, which are stacked or laminated in sequence. Optionally, to protect the haptics structure 5, the haptics structure 5 further includes a protective film 58 on a side of the strain gauge structure 57 away from the base substrate 51. The protective film may be made of an organic material or an inorganic material, for example, a resin material.

In some embodiments, a thickness of the base substrate 51 may be in a range of 250 um to 350 um, specifically may be 300 um; a thickness of each of the first transparent electrode 53 and the second transparent electrode 55 may be in a range of 40 nm to 300 nm; a thickness of each of the PDMS film layer 56 and the PDMS film layer 52 may be in a range of 2 um to 4 um, and specifically may be 3 um.

Figure 3:
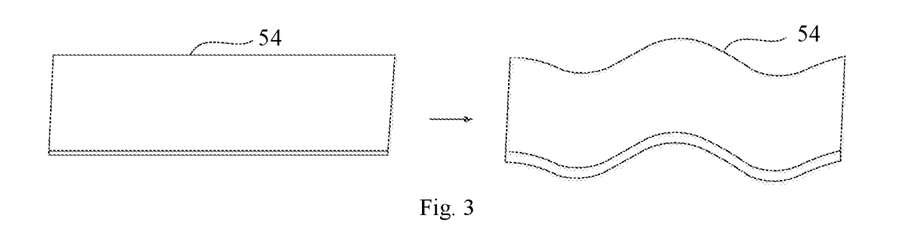
FIG. 3 is a schematic view of a piezoelectric ceramic film before and after deformation according to an embodiment of the present disclosure.

FIG. 3 is a schematic view of a piezoelectric ceramic film before and after deformation according to an embodiment of the present disclosure. As shown in the left figure of FIG. 3, when no electrical signal is received, the piezoelectric ceramic film 54 is flat; as shown in the right figure of FIG. 3, when a voltage is applied between the first transparent electrode and the second transparent electrode, the piezoelectric ceramic film 54 is deformed to form a corresponding feedback. For the deformer, the second transparent electrode may be grounded, and the controller controls the deformer by applying a voltage signal to the first transparent electrode.

Optionally, the controller is configured to generate an alternating current voltage signal to drive the deformer to deform. For example, the second transparent electrode of the deformer is grounded, and when the alternating current voltage signal is applied to the first transparent electrode, the shape of the piezoelectric ceramic film 54 changes. Since the alternating current voltage signal has a high frequency, a user can experience the feeling of vibration and surface roughness when touching, thereby further improving the touch interaction experience. The frequency and amplitude of the alternating current voltage signal may be set according to the actual situation.

In some embodiments, one of the first transparent electrode and the second transparent electrode is grounded, and the other of the first transparent electrode and the second transparent electrode is inputted with a voltage control signal sent by the controller; the voltage control signal is an alternating current voltage signal, and an amplitude of the alternating current voltage signal is set according to the touch pressure of the touch operation. In this way, the tactile feedback of the haptics structure can be made more realistic, improving the user experience.

In some embodiments, the haptics structure 5 further includes a strain gauge structure 57 configured to detect or measure a deformation amount of the deformer, so as to determine whether the deformation amount of the deformer satisfies the requirement. It can be understood that the deformation amount of the deformer is used to respond to or feed back the pressure of the user touching the touch screen, so that the deformation amount of the deformer should satisfy an amplitude of the touching pressure of the user.

Figure 4:
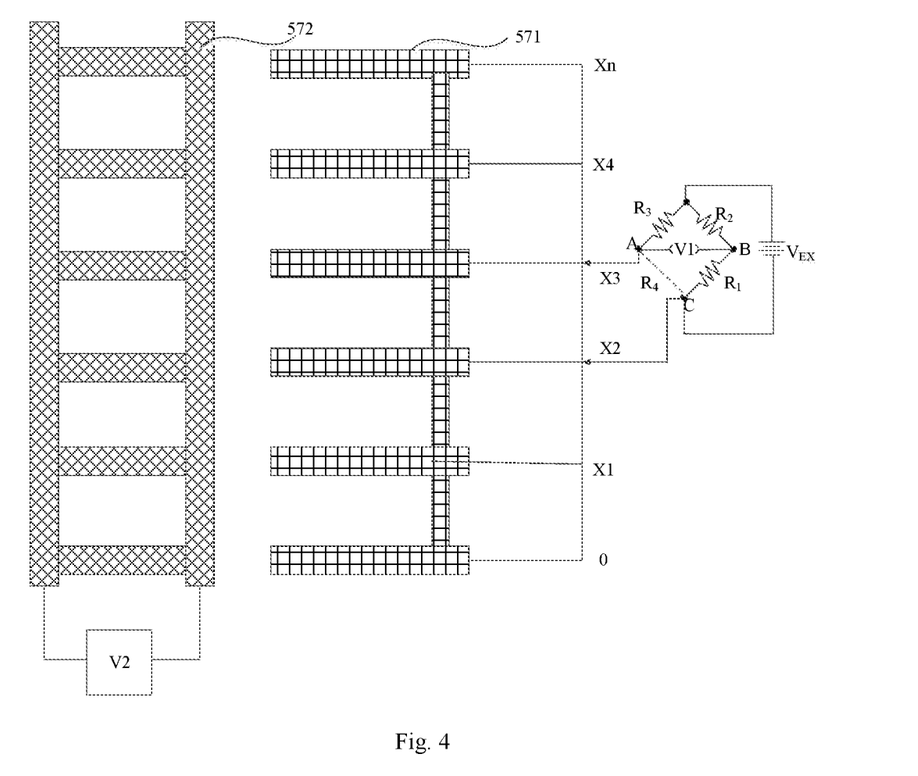
FIGS. 4 and 5 are schematic views of a strain gauge structure according to embodiments of the present disclosure.
Figure 5:
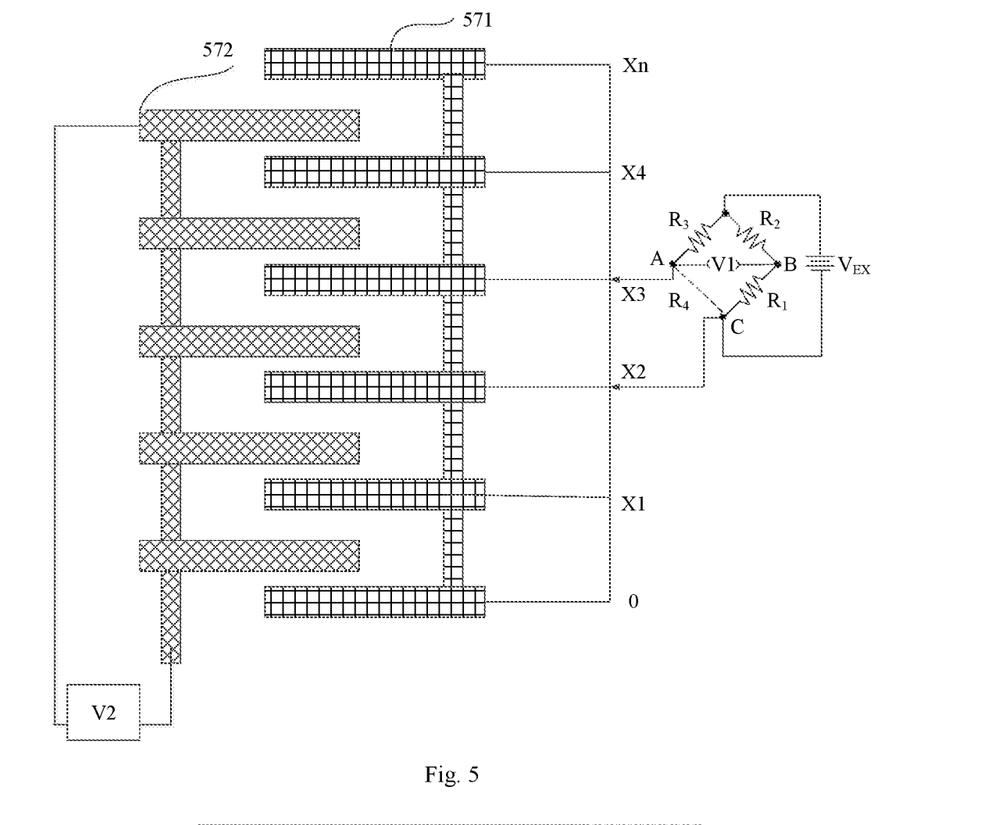

FIG. 4 and FIG. 5 are schematic views of a strain gauge structure according to embodiments of the present disclosure. As shown in FIG. 4 and FIG. 5, the strain gauge structure 57 includes a first trace 571 and a second trace 572, and the layout of the first trace 571 and the second trace 572 may as shown in FIG. 4 or FIG. 5. Two ends of the second trace 572 are connected to a voltmeter with the reading of V2, and the voltmeter is used to measure an overall deformation and estimate the degradation of strain gauge with reference to the overall deformation. The first trace 571 may be designed as having a plurality of sections, and as shown in FIG. 4 or FIG. 5, different location points X1, X2 . . . , Xn are distributed between two ends of the first trace 571, two location points such as X2 and X3 may be selected from the plurality of location points between the two ends of the first trace 571, and a Wheatstone bridge structure is connected between the two location points X2 and X3. The Wheatstone bridge structure is provided with three resistors $R_1$, $R_2$, $R_3$ having known resistances, and a resistor between part segments X2 and X3 of the first trace 571 may be regarded as the fourth resistor $R_4$ of the Wheatstone bridge structure. A voltmeter is connected between points A and B of the Wheatstone bridge structure that are opposite, and the measured voltage value is V1. If a difference between V1 and V2 values exceeds a standard value for the strain gauge structure, it indicates failure of the strain gauge structure 57.

Figure 6:
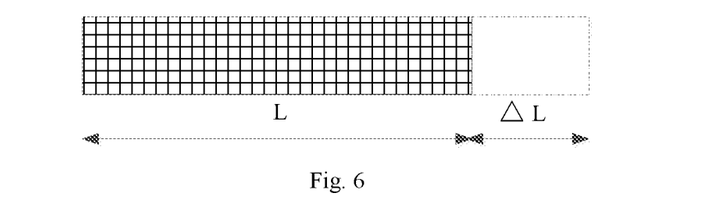
FIG. 6 is a schematic view shows deformation of a trace of a strain gauge structure according to an embodiment of the present disclosure.

FIG. 6 is a schematic view shows deformation of a trace of a strain gauge structure according to an embodiment of the present disclosure. When the deformer is deformed, as shown in FIG. 6, the length of the first trace 571 is changed. For example, an original length of the first trace 571 is L, and after the deformation of the deformer, the length of the first trace 571 will become L+ΔL, where the change amount of the length is ε=ΔL/L. A line width of the first trace 571 changes accordingly, resulting a change of the resistance of the first trace 571. As shown in FIGS. 4 and 5, a voltage value V1 between two points of A and B is detected, and a resistance value between two location points, such as X2 and X3, of the first trace 571 is determined by using a Wheatstone bridge principle based on the voltage value V1, so as to determine a change amount of the first trace 571 between the two location points and determine a deformation amount of the deformer at a corresponding position. The principle of the Wheatstone bridge is shown as the following formula:

$$V1 = \left[\frac{R_3}{R_3+R_4} - \frac{R_2}{R_1+R_2}\right] * V_{EX}$$

where $V_{EX}$ is a fixed voltage, resistors $R_1$, $R_2$, $R_3$ and $R_4$ of the Wheatstone bridge are referred to as four arms of the bridge, resistance values of $R_1$, $R_2$ and $R_3$ are fixed, and a resistance value of the fourth resistor $R_4$ may be obtained by measuring the voltage value V1 of the voltmeter. The resistance value of the fourth resistor $R_4$, i.e. the resistance value between two points A and C, is equal to the resistance value between part segments X2 and X3 of the first trace 571, and based on this principle, the change amount of the resistance value between the two location points X2 and X3 of the first trace 571 can be determined according to the measured voltage value V1, and then the change amount of the first trace 571 between the two location points can be determined, so as to determine whether the deformation of the deformer satisfies the requirement. If the deformation of the deformer does not satisfy the requirement, an intensity of the control signal inputted to the first transparent electrode and/or the second transparent electrode may be increased or decreased to make the deformation of the deformer satisfy the requirement.

Embodiments of the present disclosure also provide a touch display panel including the haptics structure described above. The touch display panel further includes a touch screen and a display panel, the touch screen is disposed on a display side of the display panel, and the haptics structure is disposed on a side of the touch screen facing away from the display panel.

In some embodiments, the touch display panel includes a display area and a bezel area, and the haptics structure is located in the display area of the display panel. The haptics structure provided by the above embodiments of the present disclosure is provided in the display area of a display panel, and as compared to a display device having a piezoelectric vibrator provided on a bezel in the related art, such a display panel is advantageous in realizing a narrow bezel.

Embodiments of the present disclosure also provide a touch display device including the touch display panel described above. The touch display device provided by the embodiments of the present disclosure may be any product or component having a display function such as a notebook computer with a display screen, a display, a television, a digital photo frame, a mobile phone, a tablet computer, etc.

In some embodiments, the touch display device includes: a touch detection circuit and a controller, where the touch detection circuit is configured to: detect a touch operation on the touch screen, and send a touch pressure and a touch position of the touch operation to the controller; the controller is configured to: send a voltage control signal to the deformer of the haptics structure based on the touch operation, where a voltage magnitude of the voltage control signal has a preset corresponding relation with the touch pressure of the touch operation.

In some embodiments, the controller is configured to: receive the deformation amount of the deformer under an action of the voltage control signal that is measured by the strain gauge structure; determine whether the deformation amount satisfies a requirement of the touch pressure of the touch operation; and adjust the voltage control signal, and send the adjusted voltage control signal to the deformer, when the deformation amount does not satisfy the requirement of the touch pressure of the touch operation.

Embodiments of the present disclosure also provide a method for fabricating a haptics structure, including:

providing the base substrate;

fabricating the platelike deformer on the base substrate, where the fabricating the platelike deformer on the base substrate includes: fabricating the first transparent electrode, the electrostrictive material layer and the second transparent electrode sequentially on the base substrate; and forming the strain gauge structure on the side of the deformer away from the base substrate.

In an embodiment, the fabricating the platelike deformer on the base substrate includes:

providing a sapphire substrate;

growing the electrostrictive material layer on the sapphire substrate;

forming the first transparent electrode on a side of the electrostrictive material layer away from the sapphire substrate;

bonding a surface of the first transparent electrode away from the sapphire substrate onto the base substrate;

peeling the sapphire substrate from the electrostrictive material layer; and forming the second transparent electrode on a side of the electrostrictive material layer away from the first transparent electrode, where the forming the strain gauge structure on the side of the deformer away from the base substrate includes: forming the strain gauge structure on a side of the second transparent electrode away from the electrostrictive material layer.

In the embodiments, by growing an electrostrictive material layer on a sapphire substrate and then transferring the electrostrictive material layer onto the base substrate, additional polarization does not need to be performed on the electrostrictive material layer, thus the piezoelectric effect of the electrostrictive material layer is ensured. In the embodiments, a platelike deformer is provided on the base substrate; when a voltage is applied between the first transparent electrode and the second transparent electrode, the electrostrictive material layer located between the first transparent electrode and the second transparent electrode is deformed, and then the whole platelike deformer is deformed. In this manner, when the haptics structure is applied to the touch display device, the deformer can cover part of a display area of the display panel, or even the whole display area, such that when haptics is performed, the deformer can effectively drive various regions of the display panel to vibrate, thereby improving the touch interaction experience and increasing the perceived effect of surface haptics. Furthermore, when the haptics structure provided by the embodiments of the present disclosure is applied to a touch display device, the haptics structure may be provided in a display area of a display panel, and as compared to a display device with a piezoelectric vibrator provided on a bezel in the related art, such a display panel is advantageous in realizing a narrow bezel.

In some optional embodiments, the base substrate is a flexible substrate. For example, a PET film may be used as the base substrate. In some alternative embodiments, the first transparent electrode and the second transparent electrode may be made of a transparent conductive material such as ITO or IZO. Since the first transparent electrode and the second transparent electrode are light-transmitting, when the deformer is provided in the display area of the display panel, the display effect of the display panel will not be greatly affected. In some optional embodiments, the electrostrictive material layer may be a piezoelectric ceramic, or may be made of other materials, which is not limited thereto. In some embodiments, a thickness of the electrostrictive material layer is in a range of 2 um to 20 um, where endpoint values are inclusive. When the thickness of the electrostrictive material layer is in this range, it is ensured that effective deformation of the electrostrictive material layer is driven by an electric signal.

In some embodiments, the electrostrictive material layer includes a piezoelectric ceramic film, and after growing the electrostrictive material layer on the sapphire substrate, the method further includes: performing air annealing on the piezoelectric ceramic film at a temperature greater than 650° C. for not less than one hour, so that the piezoelectric characteristics of the piezoelectric ceramic film can be improved.

In some embodiments, the bonding a surface of the first transparent electrode away from the sapphire substrate onto the base substrate includes: bonding the first transparent electrode and the base substrate by using a polydimethylsiloxane (PDMS) film through thermally pressing. Since the adhesion between the first transparent electrode and the base substrate is poor, the base substrate and the deformer may be bonded together via PDMS, which may improve the adhesion between the first transparent electrode and the base substrate.

In some embodiments, the forming the strain gauge structure on the side of the second transparent electrode away from the electrostrictive material layer includes: bonding the second transparent electrode and the strain gauge structure by using a polydimethylsiloxane (PDMS) film through thermally pressing. Since the adhesion between the second transparent electrode and the strain gauge structure is poor, the strain gauge structure and the deformer may be bonded together via PDMS, which may improve the adhesion between the second transparent electrode and the strain gauge structure.

In some embodiments, the peeling the sapphire substrate from the electrostrictive material layer includes: peeling the sapphire substrate off from the electrostrictive material layer by using a laser with a first wavelength ranging from 230 nm to 260 nm.

Figure 7:
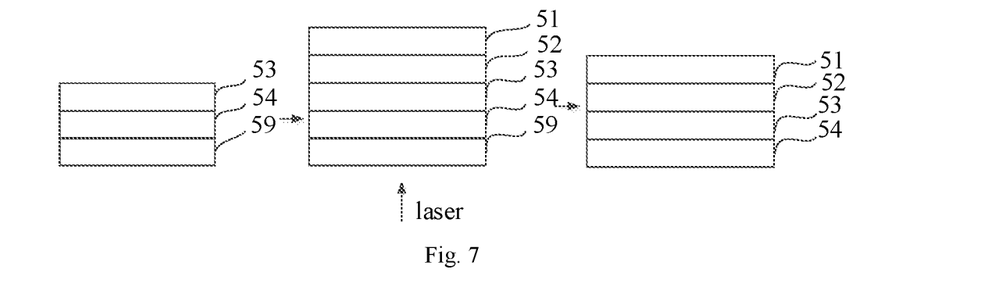
FIG. 7 is a schematic view of a process for fabricating a haptics structure according to an embodiment of the present disclosure.

In a specific example, the fabrication method according to an embodiment includes the following steps:

step 1, as shown in FIG. 7, growing a PZT (piezoelectric ceramic) film 54 with a thickness of 2 um to 20 um on a sapphire substrate 59, which may be grown by using RF (radio frequency) sputtering; where a working gas pressure during sputtering may be 5 mTorr, a starting gas pressure is $2\times10^{-6}$ Torr, an RF power is 100 W, and the working gas used herein is a mixed gas of Ar and $O^2$, where the flow rate of Ar is 28.5 sccm, and the flow rate of $O^2$ is 1.5 sccm;

step 2, performing air annealing on the piezoelectric ceramic film 54 at a temperature greater than 650° C. for not less than one hour; in this way, the piezoelectric ceramic film 54 can form a regular lattice, so as to improve the piezoelectric characteristics of the piezoelectric ceramic film 54;

step 3, forming a transparent conductive film on the piezoelectric ceramic film 54, and patterning the transparent conductive film to form a first transparent electrode 53; where an ITO film with a thickness of 40 nm to 300 nm may be formed by sputtering, the working gas pressure during sputtering may be 5 mTorr, the starting gas pressure is $1\times10^{-6}$ Torr, the RF power is 150 W, and the working gas as used is a mixed gas of Ar and $O^2$, where the flow rate of Ar is 28 sccm, and the flow rate of $O^2$ is 2 sccm;

step 4, thermally pressing the piezoelectric ceramic film 54 formed with the first transparent electrode 53 to the base substrate 51 formed with the PDMS film layer 52 to make them bonded together, where a thermally pressing temperature may be 120° C., and a working pressure may be 1 atmosphere;

step 5, peeling the piezoelectric ceramic film 54 formed with the first transparent electrode 53 from the sapphire substrate 59 by a laser having a wavelength of 248 nm;

step 6, forming a transparent conductive film on the piezoelectric ceramic film 54, and patterning the transparent conductive film to form a second transparent electrode 55; where an ITO film with a thickness of 40 nm to 300 nm may be formed by sputtering, the working gas pressure during sputtering may be 5 mTorr, the starting gas pressure is $1\times10^{-6}$ Torr, the RF power is 150 W, and the working gas as used is a mixed gas of Ar and $O^2$, where the flow rate of Ar is 28 sccm, and the flow rate of $O^2$ is 2 sccm;

step 7, bonding the strain gauge structure 57 to the second transparent electrode 55 by using the PDMS film layer 56 through thermally pressing, wherein the thermally pressing temperature may be 120° C., and the working gas pressure may be 1 atmosphere; and step 8, forming a protective film 58.

The haptics structure shown in FIG. 2 has been formed through the above steps 1 to 8.

In various method embodiments of the present disclosure, sequence numbers of steps cannot be used to define the chronological order of the steps, and a person of ordinary skill in the art can change the order of each step without involving inventive effort, which shall fall within the scope of the present disclosure.

It should be noted that the various embodiments described herein are described in a progressive manner, the same or similar parts throughout the various embodiments can be referred each other, and each embodiment focuses on the difference from the other embodiments. In particular, the method embodiments are described more simply because they are substantially similar to the product embodiments, and the relevant parts or contents can referred to the product embodiments.

Unless otherwise defined, technical terms or scientific terms used in the present disclosure shall have the usual meanings understood by those with ordinary skills in the field to which this disclosure belongs. Similar words such as "first" and "second" used in the present disclosure do not indicate any order, quantity or importance, but are only used to distinguish different components. Similar words such as "include" or "comprise" mean that an element or item appearing before the word covers an element or item listed after the word and their equivalents, but does not exclude other elements or items. Similar words such as "connected", "coupled" or "interconnected" are not limited to physical or mechanical connections, but may include electrical connections, whether direct or indirect. Similar words such as "on", "below", "left" and "right" are only used to indicate a relative position relationship, and when an absolute position of the described object changes, the relative position relationship may also change accordingly.

It is appreciated that when an element such as a layer, film, region, or substrate is referred to as being "on" or "below" another element, the element may be "directly" "on" or "below" the other element, or there may be an intermediate element between the two elements.

In the description of the foregoing embodiments, specific features, structures, materials, or characteristics may be combined in any one or more embodiments or examples in a suitable manner.

The above embodiments are just specific implementations of the present disclosure, but the protection scope of the present disclosure is not limited thereto. Any person skilled in the art can easily think of changes or substitutions within the technical scope disclosed in the present disclosure, which shall fall within the protection scope of the present disclosure. Therefore, the protection scope of the present disclosure should be subject to the protection scope of the appended claims.

What is claimed is:

1. A haptics structure, comprising: a base substrate; a platelike deformer on the base substrate, wherein the deformer comprises a first transparent electrode, a second transparent electrode and an electrostrictive material layer between the first transparent electrode and the second transparent electrode, wherein the electrostrictive material layer is deformed when a voltage is applied between the first transparent electrode and the second transparent electrode; and a strain gauge structure located on a side of the deformer away from the base substrate, configured to measure a deformation amount of the deformer; wherein the base substrate and the deformer are bonded together through a polydimethylsiloxane (PDMS) film, and/or the strain gauge structure and the deformer are bonded together through a PDMS film.

2. The haptics structure according to claim 1, wherein the electrostrictive material layer comprises a piezoelectric ceramic.

3. The haptics structure according to claim 1, wherein a thickness of the electrostrictive material layer is between 2 μm and 20 μm where endpoint values are inclusive.

4. The haptics structure according to claim 1, further comprising a protective film located on a side of the strain gauge structure away from the base substrate.

5. The haptics structure according to claim 1, wherein each of the first transparent electrode and the second transparent electrode has a thickness ranging from 40 nm to 300 nm, and the PDMS film has a thickness ranging from 2 μm to 4 μm.

6. The haptics structure according to claim 1, comprising: a controller, wherein the controller is configured to:
send a voltage control signal to the deformer based on a touch operation on the haptics structure, wherein a voltage magnitude of the voltage control signal has a preset corresponding relation with a touch pressure of the touch operation.

7. The haptics structure according to claim 6, wherein the controller is further configured to:
receive the deformation amount of the deformer that is under an action of the voltage control signal and is measured by the strain gauge structure;
determine whether the deformation amount satisfies a requirement of the touch operation; and
adjust the voltage control signal, and send the adjusted voltage control signal to the deformer, when the deformation amount does not satisfy the requirement of the touch operation.

8. The haptics structure according to claim 6, wherein one of the first transparent electrode and the second transparent electrode is grounded, and the other of the first transparent electrode and the second transparent electrode is inputted with the voltage control signal sent by the controller;
the voltage control signal is an alternating current voltage signal, and the controller is configured to set a frequency and an amplitude of the alternating current voltage signal based on the touch pressure of the touch operation.

9. A touch display panel, comprising the haptics structure according to claim 1, wherein the touch display panel further comprises a touch screen and a display panel, the touch screen is arranged on a display side of the display panel, and the haptics structure is arranged on a side of the touch screen away from the display panel.

10. The touch display panel according to claim 9, comprising a display area and a bezel area, wherein the haptics structure is located in the display area of the display panel.

11. A touch display device, comprising the touch display panel according to claim 9.

12. The touch display device according to claim 11, comprising a touch detection circuit and a controller,
wherein the touch detection circuit is configured to: detect a touch operation on the touch screen, and send a touch pressure and a touch position of the touch operation to the controller; and
the controller is configured to: send a voltage control signal to the deformer of the haptics structure based on the touch pressure and the touch position of the touch operation, wherein a voltage magnitude of the voltage control signal has a preset corresponding relation with the touch pressure of the touch operation.

13. The touch display device according to claim 12, wherein the controller is configured to:
receive the deformation amount of the deformer that is under an action of the voltage control signal and is measured by the strain gauge structure;
determine whether the deformation amount satisfies a requirement of the touch pressure of the touch operation; and
adjust the voltage control signal and send the adjusted voltage control signal to the deformer, when the deformation amount does not satisfy the requirement of the touch pressure of the touch operation.

14. A method for fabricating the haptics structure according to claim 1, wherein the method comprises:
providing the base substrate;
fabricating the platelike deformer on the base substrate, wherein the fabricating the platelike deformer on the base substrate comprises: fabricating the first transparent electrode, the electrostrictive material layer and the second transparent electrode sequentially on the base substrate; and
forming the strain gauge structure on the side of the deformer away from the base substrate.

15. The method for fabricating the haptics structure according to claim 14, wherein the fabricating the platelike deformer on the base substrate comprises:
providing a sapphire substrate;
growing the electrostrictive material layer on the sapphire substrate;
forming the first transparent electrode on a side of the electrostrictive material layer away from the sapphire substrate;
bonding a surface of the first transparent electrode away from the sapphire substrate onto the base substrate;
peeling the sapphire substrate from the electrostrictive material layer; and
forming the second transparent electrode on a side of the electrostrictive material layer away from the first transparent electrode,
wherein the forming the strain gauge structure on the side of the deformer away from the base substrate comprises: forming the strain gauge structure on a side of the second transparent electrode away from the electrostrictive material layer.

16. The method for fabricating the haptics structure according to claim 15, wherein the electrostrictive material layer comprises a piezoelectric ceramic film, and after growing the electrostrictive material layer on the sapphire substrate, the method further comprises:
performing air annealing on the piezoelectric ceramic film at a temperature greater than 650° C. for not less than one hour.

17. The method for fabricating the haptics structure according to claim 15, wherein the bonding a surface of the first transparent electrode away from the sapphire substrate onto the base substrate comprises:
bonding the first transparent electrode and the base substrate by using a polydimethylsiloxane (PDMS) film through thermally pressing.

18. The method for fabricating the haptics structure according to claim 15, wherein the forming the strain gauge structure on the side of the second transparent electrode away from the electrostrictive material layer comprises:
bonding the second transparent electrode and the strain gauge structure by using a polydimethylsiloxane (PDMS) film through thermally pressing.

19. The method for fabricating the haptics structure according to claim 15, wherein the peeling the sapphire substrate from the electrostrictive material layer comprises:
peeling the sapphire substrate from the electrostrictive material layer by using a laser with a first wavelength ranging from 230 nm to 260 nm.

* * * * *